(12) United States Patent
Kazama

(10) Patent No.: US 6,466,411 B1
(45) Date of Patent: Oct. 15, 2002

(54) MAGNETIC HEAD DEVICE SUPPORTED BY A BENT LOAD BEAM

(75) Inventor: Toshio Kazama, Niigata-ken (JP)

(73) Assignee: Alps Electric Co., Ltd., Tokyo (JP)

(*) Notice: Subject to any disclaimer, the term of this patent is extended or adjusted under 35 U.S.C. 154(b) by 79 days.

(21) Appl. No.: 09/634,382

(22) Filed: Aug. 9, 2000

(30) Foreign Application Priority Data

Aug. 9, 1999 (JP) .......................................... 11-225179

(51) Int. Cl.[7] .................................................. G11B 5/55
(52) U.S. Cl. .................................................. 360/244.2
(58) Field of Search .......................... 360/244.2–245.2; 369/44.15–44.22

(56) References Cited

U.S. PATENT DOCUMENTS

| | | |
|---|---|---|
| 4,724,500 A | 2/1988 | Dalziel |
| 5,333,085 A | 7/1994 | Prentice et al. |
| 5,467,237 A | 11/1995 | Takahashi |
| 5,657,300 A * | 8/1997 | Takahashi ................ 360/244.2 |
| 5,838,517 A | 11/1998 | Frater et al. |

FOREIGN PATENT DOCUMENTS

EP 0 860 815 A1 8/1998

* cited by examiner

Primary Examiner—A. J. Heinz
(74) Attorney, Agent, or Firm—Brinks Hofer Gilson & Lione (57) ABSTRACT

A magnet head device capable of minimizing the sway of a head body in a direction parallel to a front surface of a recording medium, and which allows easy application of a pressing force to press the head body into contact with the front surface of the recording medium. In one embodiment of the invention, the magnetic head comprises a carriage having a main body extending over a recording medium, an elastically deformable support member connected to the bent portion of the carriage, and a head body installed to the support member. The support member may be fixed in surface-contact with the bent portion of the carriage and bent at a surface where the support member is fixed to the bent portion and extends along the recording medium. In one embodiment, the corner of the bend of the support member provides the support point of connection.

20 Claims, 5 Drawing Sheets

MAGNETIC HEAD DEVICE SUPPORTED BY A BENT LOAD BEAM

BACKGROUND OF THE INVENTION

1. Field of the Invention

The present invention relates to a magnetic head device mounted on, for example, a magneto-optical disk apparatus and, more particularly, to a magnetic head device capable of minimizing a sway of a head body which is parallel to a surface of a recording medium, and permitting easy application of load to the head body toward the recording medium.

2. Description of the Related Art

Figure 6:
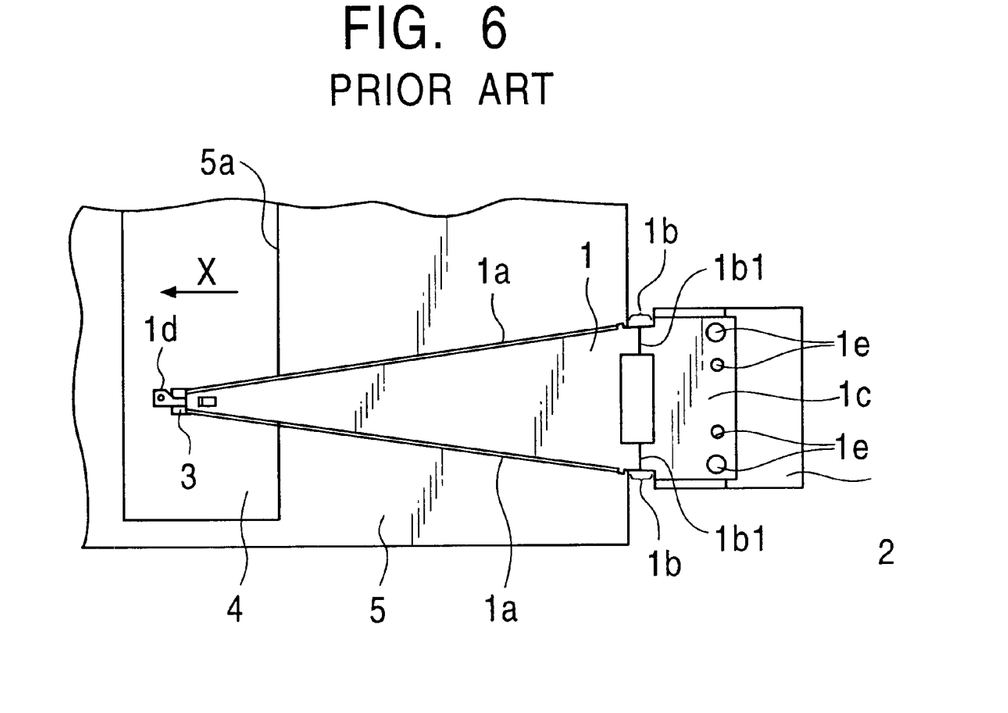
FIG. 6 is a top plan view showing a conventional magnetic head device.
Figure 7:
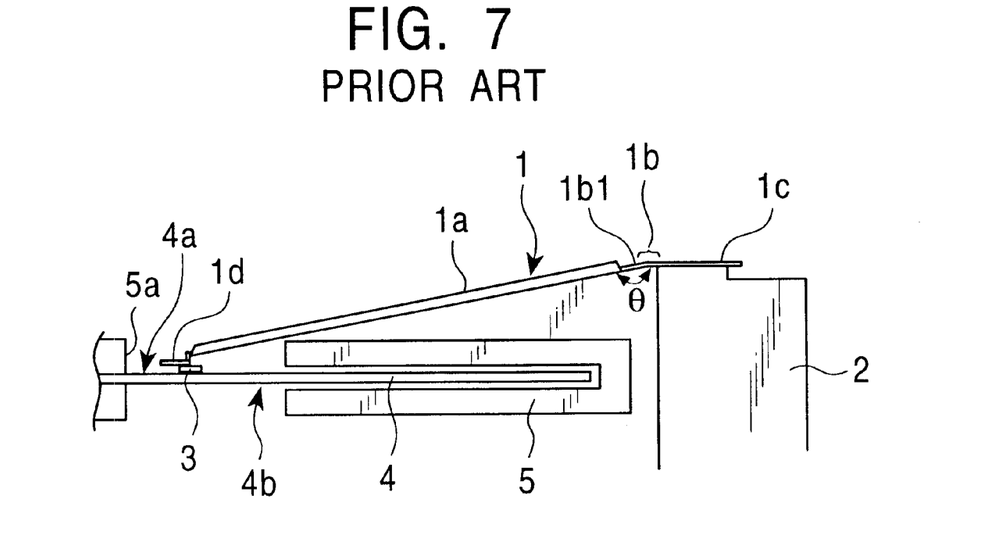
FIG. 7 is a side view showing the conventional magnetic head device.

FIG. 6 is a top plan view showing a conventional magnetic head device, and FIG. 7 is a side view of the magnetic head device of FIG. 6.

In the magnetic head device shown in FIGS. 6 and 7, a proximal end portion 1c of a load beam 1, which is a supporting member, is fixed to a carriage 2, which is a rigid member, via fixing holes 1e and 1e. A head body 3 is attached to a distal end portion 1d of the load beam 1 via a flexure. For the purpose of clarity, the flexure is not shown in FIGS. 6 and 7.

The load beam 1 is formed of a leaf spring. In the load beam 1, rails 1a and 1a, which are rigid, are formed on both sides from a vicinity of a distal end thereof to a vicinity of the proximal end portion 1c. Leaf spring portions 1b and 1b, which are free of the rails 1a and 1a and have low rigidity, are provided between terminals of the rails 1a and 1a and the proximal end portion 1c. The load beam 1 is bent by a predetermined angle θ at flexed portions 1b1 and 1b1 of the leaf spring portions 1b and 1b, the distal end portion 1d of the load beam 1 being close to a recording medium 4.

The magnetic head device shown in FIGS. 6 and 7 is used to provide, for example, a vertical magnetic field for recording in a magneto-optical disk apparatus.

The recording medium 4 of a magneto-optical disk apparatus is protected by a cartridge 5 made of a plastic constituent or the like. Hence, the load beam 1 sets the head body 3 over a front surface 4a of the recording medium from above an opening 5a, extending over the cartridge 5 located between the carriage 2 and the opening 5a of the cartridge 5.

Figure 8:
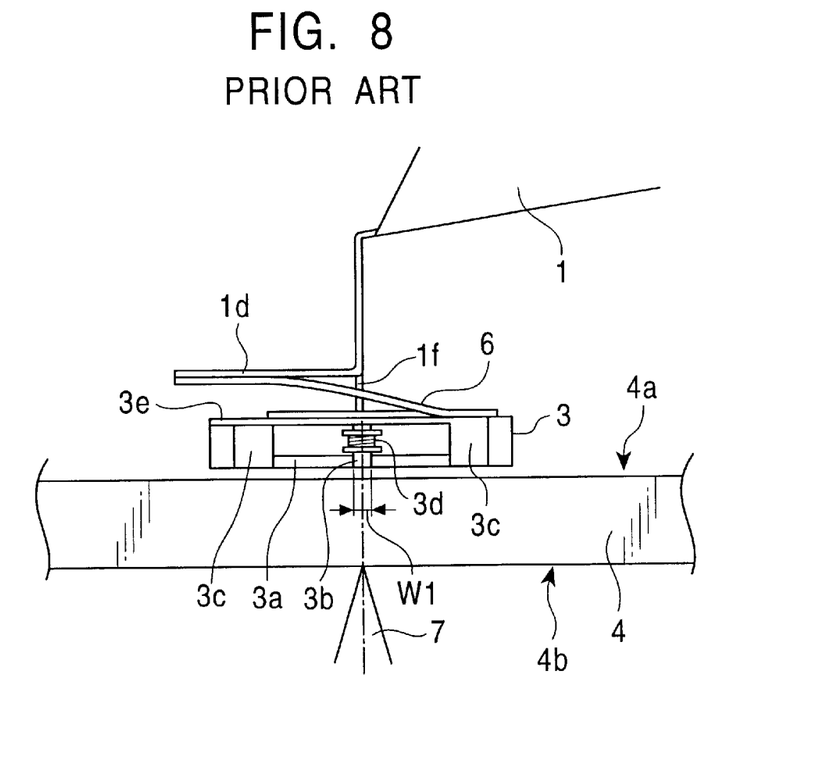
FIG. 8 is a side view showing an enlarged portion of a neighborhood of a head body.

The head body 3 is subjected to an air flow generated as the recording medium 4 rotates, and lifts for a predetermined lifting distance. FIG. 8 is a side view of an enlarged portion of a neighborhood of the lifting head body 3.

The head body 3 includes a center core 3b and side cores 3c and 3c formed of a magnetic material, such as ferrite, that are installed in a cutout of a slider 3a formed of a nonmagnetic material, such as a ceramic constituent. A coil 3d is wound around the center core 3b. Bottom surfaces of the center core 3b and the side cores 3c and 3c are flush with a bottom surface of the slider 3a. A back core 3e made of a magnetic material, such as ferrite, is installed on top surfaces of the slider 3a, the center core 3b, and the side cores 3c and 3c. The head body 3 is supported by the load beam 1 via a flexure 6 joined to the back core.

A pivot 1f serving as a pivoting support point of the head body extends toward the recording medium 4 from a distal end portion 1d of the load beam 1. The pivot 1f is abutted against the top surface of the head body 3 via the flexure 6 to pivotally support the head body 3.

In the head body 3, when the coil 3d is energized, a closed magnetic path including the center core 3b, the back core 3e, and the side cores 3c and 3c is formed, and a vertical magnetic field is applied from the center core 3b to the recording medium 4. Energy of a laser beam 7 is applied to a rear surface 4b of the recording medium to record signals onto the recording medium 4 by magnetic modulation or optical modulation.

The recording medium 4 sometimes vertically teeters while rotating. The lifting distance of the head body 3 is set to a predetermined value, and the head body 3 is adapted to vertically move also. The head body 3 is able to move according to the vertical dislocation of the recording medium 4 because the load beam 1 is allowed to vertically teeter around the flexed portions 1b1 and 1b1 of the leaf spring portions 1b and 1b.

The conventional magnetic device as shown in FIGS. 6 and 7, however, has been posing a problem in that the head body 3 is significantly dislocated in a direction parallel to the front surface 4a of the recording medium when the head body 3 moves according to the vertical teeter of the recording medium 4.

Figure 9:
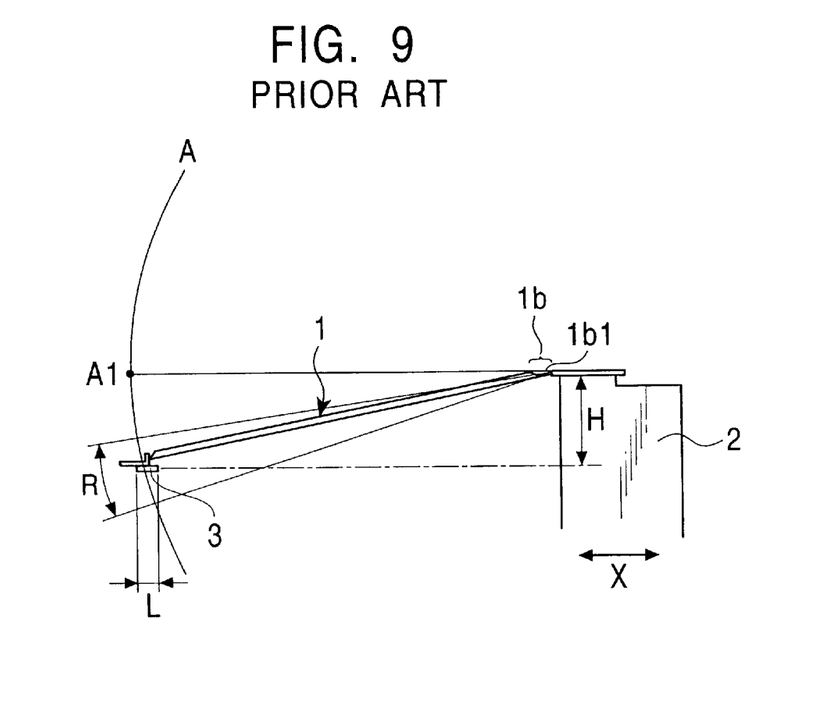
FIG. 9 is a side view illustrating a relationship between a vertical teetering distance of a support member and a teetering distance of a magnetic head in a direction parallel to a front surface of a recording medium in the conventional magnetic head device.

When the load beam 1 vertically teeters around the flexed portions 1b1 and 1b1, the pivot 1f, which is in contact with the top surface of the head body 3 to support the head body 3 so that it is allowed to teeter, moves along an arc A, having the flexed portion 1b1 shown in FIG. 9 as a center thereof. When the pivot 1f vertically moves by R on the arc A, a teetering distance of the pivot 1f in a direction X of FIG. 9 which is parallel to the front surface 4a of the recording medium is denoted by L.

In recent years, because of an increasing trend toward reducing a thickness of the recording medium 4, the vertical dislocation of the recording medium 4 during rotation is increasing. Accordingly, a teetering distance R of the pivot 1f in direction A of the arc and a teetering distance L in the direction parallel to the front surface 4a of the recording medium are increasing.

The teetering distance L in the direction parallel to the front surface 4a of the recording medium of the pivot 1f must be controlled to a certain range wherein the center core 3b shown in FIG. 8 stays in an area of the recording medium 4 where the center core 3b is activated by the energy of the laser beam 7. However, mainly due to a trend toward higher recording density of optical disk devices, there has been a demand for reducing a width W1 of the center core 3b, which requires the teetering distance L of the pivot 1f be further shortened.

To minimize the teetering distance L in the direction parallel to the front surface 4a of the recording medium when the teetering distance R of the pivot 1f in the circumferential direction remains unchanged, an arrangement must be made so that the pivot 1f vertically moves about an intersection A1 of a straight line that passes the flexed portion 1b1 serving as the teeter support point of the load beam 1 and is parallel to the front surface 4a of the recording medium, and the arc A.

In the conventional magnetic head device, however, the head body 3 is set on the recording medium 4 through the opening 5a of the cartridge 5, which protects the recording medium 4 as illustrated in FIGS. 6 and 7. Hence, the head body 3 is positioned below the flexed portion 1b1 of the load beam 1. Especially because the load beam 1 extends in the X-direction of FIG. 6, in which the recording medium 4 rotates, so as to set the head body 3 on the recording medium 4 as shown in FIGS. 6 and 7, a total length of the load beam 1 increases, and a height difference H between the pivot 1f and the flexed portion 1b1 of the load beam 1 increases. As a result, the teetering distance L in the direction parallel to the front surface 4a of the recording medium when the pivot If vertically moves by R on the arc A increases. Hence, it has been increasingly becoming difficult for the conventional magnetic head device to meet the demand for reducing the thickness of the recording medium 4 and the core width of the center core 3b of the head body 3.

Furthermore, as the total length of the load beam 1 increases, the load beam 1 will be more susceptible to vibrations or the like, and it will be difficult to accomplish assembly accuracy.

When the recording medium 4 is at rest, the head body 3 need to be pressed against the front surface 4a of the recording medium by a pressing force from the load beam 1. To obtain the pressing force, the leaf spring portion 1b of the load beam 1 must be bent at the predetermined angle θ at the flexed portion 1b1 in the conventional magnetic head device. However, the load beam 1 is composed of a leaf spring, so that it has been difficult to accurately bend the leaf spring portion at the predetermined angle θ by bending work.

SUMMARY OF THE INVENTION

Accordingly, the present invention has been made with a view toward solving the problems described above, and it is an object thereof to provide a magnetic head device which is capable of minimizing a sway of a head body in a direction parallel to a front surface of a recording medium, and permitting easy application of a pressing force for pressing the head body into contact with the front surface of the recording medium.

To this end, according to one aspect of the present invention, there is provided a magnetic head device comprising:

a carriage having a main body extending over a recording medium, and a bent portion that is bent at a distal end of the main body toward the recording medium;

an elastically deformable support member connected to the bent portion of the carriage; and a head body which is installed to the support member directly or via another elastic member, and opposes the recording medium, wherein a support point of connection between the bent portion of the carriage and the support member is positioned closer to the recording medium than it is to the main body of the carriage, and the head body is mounted on a free end of the support member that extends along the recording medium from the support point of connection.

In the present invention, the carriage in the main body extends over the recording medium, a bent portion that is bent toward the recording medium being provided at a distal end of the main body. In other words, a distal end of the bent portion in the carriage is dropped toward the recording medium. More specifically, in the magnetic head device in accordance with the present invention, the support member is connected to the bent portion of the carriage that is dropped toward the recording medium from the main body extending over the recording medium, rather than being fixed on a top surface of the carriage outside the recording medium. The support member is able to vertically teeters about the support point of connection with the bent portion of the carriage.

According to the present invention, the support point of connection between the bent portion of the carriage and the support member can be arbitrarily brought close to the front surface of the recording medium as long as the distal end of the bent portion of the carriage does not come in contact with the recording medium. Bringing the connection support point closely to the front surface of the recording medium makes it possible to reduce a difference in height from the front surface of the recording medium between the connection support point and a portion of the head body that is attached to the support member.

The head body vertically moves according to the vertical teeter of the recording medium during its rotation. At this time, as the difference in height from the front surface of the recording medium between the connection support point and a portion of the head body that is attached to the support member decreases, the distance of the teeter of the head main body in the direction parallel to the front surface of the recording medium when the head main body vertically moves decreases.

In other words, a magnetic head device can be provided that is able to control a teeter of the head body in the direction parallel to the front surface of the recording medium to a required range even when the vertical teeter of the recording medium increases as the recording medium becomes thinner, and even when a width of a center core of the head body is required to be reduced.

Moreover, according to the present invention, the total length of the support member can be reduced since the main body of the carriage extends onto the recording medium, and the support member is connected to the bent portion that is bent toward the recording medium from the distal end of the main body. Hence, a magnetic head device can be provided which is resistant to vibrations or the like, and permits higher assembly accuracy to be achieved.

According to the present invention, the support point of connection between the bent portion of the carriage and the support member is positioned nearer to the recording medium than it is to the main body of the carriage, and the head body is attached to the free end of the support member that extends from the connection support point to the recording medium. With this arrangement, when the head body is on the front surface of the recording medium, the distal end of the support member is pushed up by the head body thereby to allow the support member to flex in a direction away from the recording medium or flex upward, using the connection support point as the support point. The support member flexed upward presses the head body into contact with the front surface of the recording medium by a reaction. This arrangement obviates the need for machining the support member to provide it with the flexing structure, which used to be necessary in the past.

In the present invention, the bent portion constituting the carriage may be formed integrally on the main body or formed by attaching a separate member to the distal end of the main body.

The present invention is especially useful in a case where the recording medium consists of a disk housed in a cartridge having an opening.

If the recording medium is accommodated in a cartridge, the conventional magnetic head device requires that the support member extend over the cartridge to move the head body to the front surface of the recording medium. This automatically results in a higher support point of the vertical teeter of the support member.

According to the present invention, if the recording medium is the disk accommodated in the cartridge having the opening, the main body of the carriage is positioned outside the cartridge, and the bent portion of the carriage extends into the cartridge through the opening, so that the connection support point can be positioned in the cartridge.

Thus, according to the present invention, the support member can be extended from the connection support point positioned in the opening of the cartridge.

In other words, according to the present invention, a height of the connection support point can be arbitrarily set in the cartridge as long as the distal end of the bent portion of the carriage does not come in contact with the recording medium.

More specifically, according to the present invention, even when the recording medium is housed in the cartridge having the opening, the difference in height from the front surface of the recording medium between the connection support point and the portion of the head body that is attached to the support member can be reduced. Therefore, when the recording medium is vertically teetered, the teeter of the head body in a direction parallel to the front surface of the recording medium can be reduced. This arrangement makes it possible to provide a magnetic head device that permits a thinner recording medium and a narrower enter core of a head body to be achieved.

The support member is formed of an elastically deformable plate. Furthermore, the support member is fixed, for example, in a state wherein the support member is in surface-contact with the bent portion of the carriage, and bent at a surface where the support member is fixed to the bent portion and extended along the recording medium so that a corner of the bend of the support member provides the connection support point.

Preferably, the support member is formed of an elastically deformable plate, and the support member has a first bent surface opposing a recording medium and a second bent surface that is formed by bending the first bent surface in a direction along the recording medium, a head body being attached to the second bent surface directly or via another elastic member.

Forming the support member as described above makes it easy to arbitrarily adjust an elastic force of the support member at the connection support point.

Preferably, in order to minimize a teeter of the head body in the direction parallel to the front surface of the recording medium when the recording medium is vertically teetered, the head body is able to teeter about a teeter support point provided on the support member, and the connection support point and the teeter support point are positioned substantially at the same height from the surface of the recording medium when the head body is being subjected to a lifting force above the recording medium due to an air flow produced when the recording medium moves.

To remove the recording medium from an optical disk apparatus or the like, it is necessary to withdraw the support member together with the entire carriage away from the front surface of the recording medium. Preferably, the carriage is provided with a braking member for restricting a deformation of the support member toward the recording medium so as to prevent the support member from flexing toward the recording medium due to a weight of the head body attached to the distal end thereof.

DESCRIPTION OF THE PREFERRED EMBODIMENTS

Figure 1:
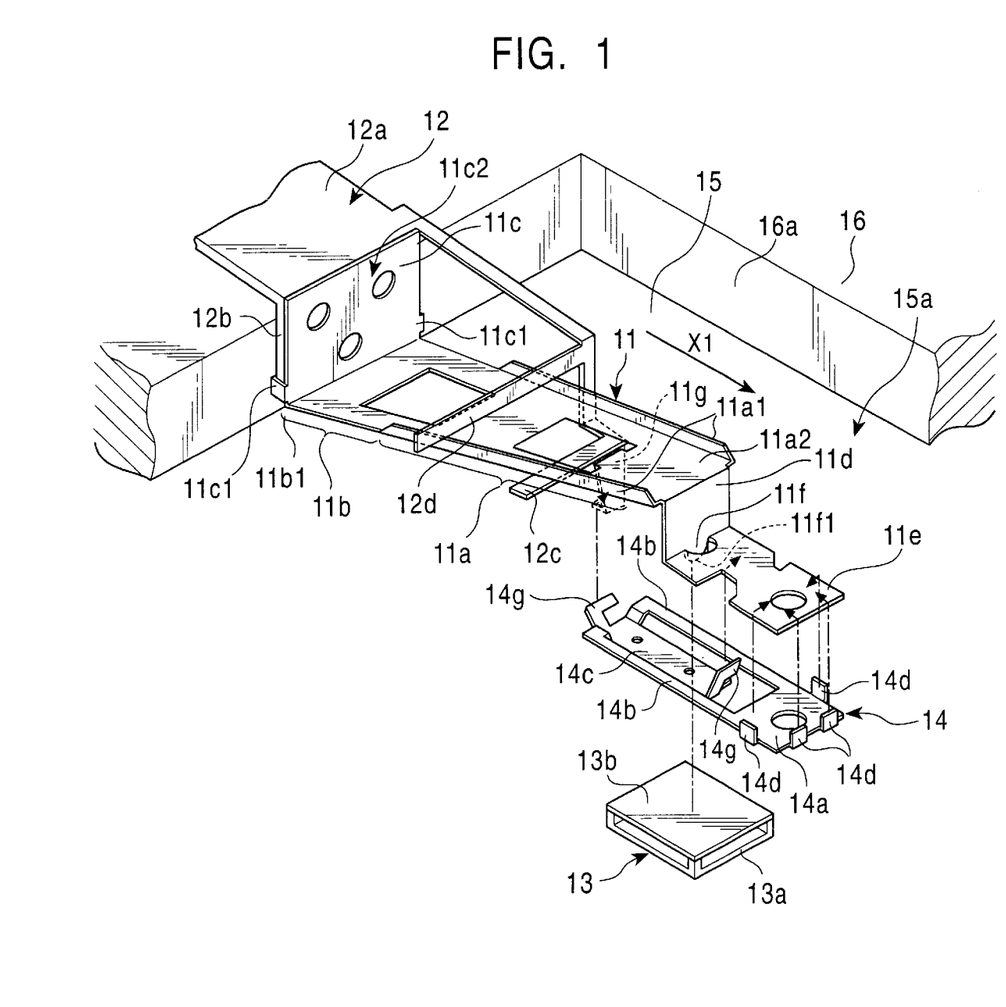
FIG. 1 is a perspective view showing a magnetic head device in accordance with an embodiment of the present invention.

FIG. 1 is an assembly view showing a magnetic head device in accordance with an embodiment of the present invention.

The magnetic head device is comprised of a load beam or support member 11, a carriage 12, a head body 13, and a flexure 14.

The load beam 11 shown in FIG. 1 extends in a direction X1 in the drawing. A recording medium 15 travels in the direction X1.

The load beam 11, which is formed of a leaf spring, has a rigid portion 11$a$, an elastic portion 11$b$, and a proximal end portion 11$c$. The rigid portion 11$a$ acquires rigidity by rails 11$a$1 and 11$a$1 formed on both sides thereof. A flat portion 11$a$2 between the rails 11$a$1 and 11$a$1 is tapered toward a distal end of the load beam 11.

The carriage 12 is rigid, and has a main body 12$a$ extending over the recording medium 15 in the traveling direction of the recording medium 15 or the X1 direction, and a bent portion 12$b$ bent at the distal end of the main body 12$a$ toward the recording medium 15. In FIG. 1, the main body 12$a$ and the bent portion 12$b$ are formed as one piece; alternatively, however, the main body and the bent portion may be composed of separate members.

The elastic portion 11$b$ of the load beam 11 has no rails, and functions as a leaf spring. Fixing hooks 11$c$1 and 11$c$1 of the proximal end portion 11$c$ of the load beam 11 are bent at a rear surface of the bent portion 12$b$ of the carriage 12, a securing surface 11$c$2 is in surface contact with a front surface of the bent portion 12$b$, and an adhesive agent is used to bond these components to thereby secure the load beam 11 to the carriage 12.

The load beam 11 is bent at the securing surface 11$c$2 and extended along the recording medium 15. A corner 11$b$1 of the bend of the load beam 11 provides a support point of connection between the bent portion 12$b$ of the carriage 12 and the load beam 11.

The recording medium 15 is a disk housed in a cartridge 16 having an opening 16$a$.

The main body 12$a$ of the carriage 12 is located outside the cartridge 16. The bent portion 12$b$ of the carriage 12 extends from the opening 16$a$ into the cartridge 16, and the corner 11$b$1 providing the connection support point of the bent portion 12$b$ of the carriage 12 and the load beam 11 is located inside the cartridge 16. The load beam 11 vertically teeters, using the corner 11$b$1, which is the connection support point, as the support point.

In other words, the connection support point of the bent portion of the carriage 12 and the load beam 11 is positioned more closely to the recording-medium 15 than it is to the main body 12a of the carriage 12.

At a free end of the load beam 11, a vertical bent surface 11d, which is a first bent surface, extends downward from a front end of the flat portion 11a2 of the rigid portion 11a. As shown in FIG. 1, at a center of a bottom surface of the vertical bent surface 11d, a plate-like pivot 11f serving as a teeter support point projects vertically with respect to the recording medium 15, the pivot 11f being an integral part of the vertical bent surface 11d. When the magnetic head device is driven, an apex 11f1 of the pivot 11f comes in contact with a top surface of the head body 13 via a head mounting surface 14c of the flexure 14 so as to support the head body 13 such that it is allowed to teeter.

A parallel bent surface 11e, which is a second bent surface, is bent at an end of the vertical bent surface 11d in a direction along the recording medium 15, and is extended. Furthermore, a tongue 11g is formed by being bent at the flat portion 11a2 of the rigid portion 11a toward the recording medium 15.

The head body 13 shares the same construction as that of the conventional head body 3 shown in FIG. 8, and is composed of a slider 13a, a core assembly, and a back plate 13b. The slider 13a is formed of a nonmagnetic ceramic material, such as calcium titanate ($TiCaO_3$). A lower surface of the slider 13a shown in FIG. 1 opposes the recording medium 15, while an upper surface thereof is fixed to and supported by the flexure 14.

The core assembly is constructed by a center core and a side core around which a coil is wound. The cores are hexahedral, and formed of a magnetic material, such as manganese zinc (Mn—Zn) ferrite.

The cores are inserted and fitted in cutouts formed in a rear side (in the drawing) of the slider 13a, and fixed by bonding. Bottoms surfaces of the cores are flush with the surface of the slider 13a that opposes the recording medium, a gap between the center core and the side core providing a magnetic gap.

The back plate 13b shown in FIG. 1 functions as a back core, and is formed of a flat plate using a magnetic material, such as manganese zinc (Mn—Zn) ferrite, as in the case of the center core and the side core. A bottom surface of the back plate 13b may be provided with an electrical insulating layer formed of a nonconductive material, such as glass ($SiO_2$), for restraining eddy-current loss.

When a recording current is supplied to the coil of the center core, a closed magnetic path that includes the center core, the back core, and the side core is formed, and a vertical magnetic field is applied from the center core to the recording medium 15. Energy of a laser beam is emitted from below the recording medium to record signals on the recording medium by magnetic modulation or optical modulation.

The flexure 14 is formed of a thin leaf spring. A fixing surface 14a and elastically deformable arms 14b and 14b are integrally coupled to the flexure 14. A head mounting surface 14c continues from the arms 14b and 14b via a step. Fixing hooks 14d, 14d, 14d, and 14d are formed on the fixing surface 14a, the fixing hooks being integral with the fixing surface 14a and bent upward in the drawing.

The head mounting surface 14c is provided with hook-shaped lugs 14g and 14g formed integrally on the head mounting surface 14c from both sides thereof. The lugs 14g and 14g are engaged with a parallel bent surface 11e and a tongue 11g of the load beam 11 when the load beam 11 and the flexure 14 are fixed. Furthermore, the fixing hooks 14d, 14d, 14d, and 14d formed on the flexure 14 are bent on the parallel bent surface 11e and adhesively fixed with a resin or the like.

In the magnetic head device in accordance with the embodiment, the main body 12a of the carriage 12, which is a rigid member, extends over the cartridge 16, and a bent portion 12b of the carriage 12 is dropped inside the opening 16a of the cartridge 16. The load beam 11 is connected to the bent portion 12b of the carriage 12, which is placed in the opening 16a of the cartridge 16.

In the magnetic head device of FIG. 1, a height of the corner 11b1, which serves as the support point of the vertical teeter of the load beam 11, can be arbitrarily set within a range in which the distal end of the bent portion 12b of the carriage 12 does not touch the recording medium 15. In this embodiment, the foregoing height is set so that the heights of the corner 11b1 and the pivot 11f of the load beam 11 from a front surface 15a of the recording medium are substantially the same when the head body 13 is flying above the recording medium 15.

Moreover, in the magnetic head device according to the embodiment, the main body 12a of the carriage 12 extends over to the recording medium 15, and the load beam 11 extends from the bent portion 12b of the carriage 12, enabling the total length of the load beam 11 to be reduced. This arrangement makes it possible to provide a magnetic head device that is resistant to vibrations, and also permits higher assembly accuracy to be achieved.

Figure 2:
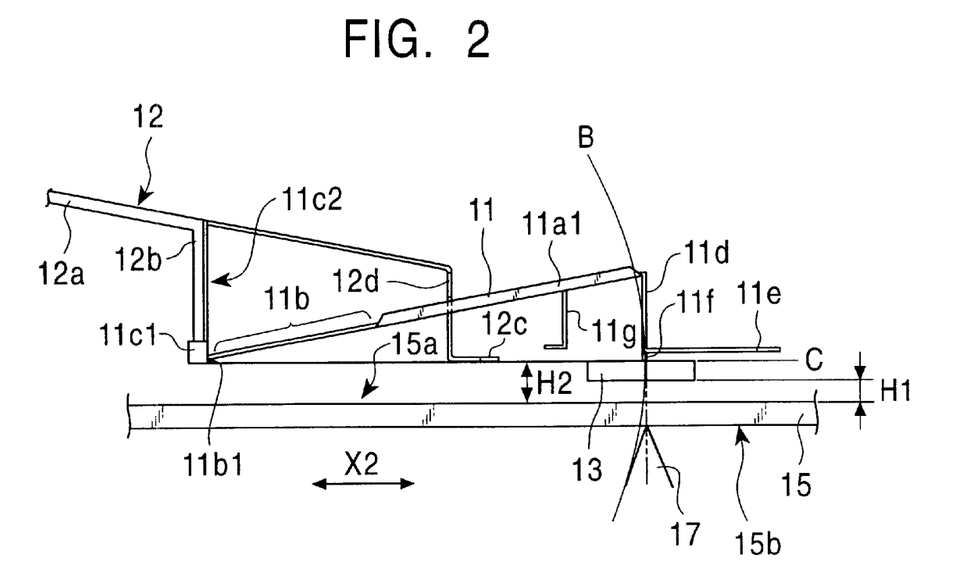
FIG. 2 is a side view showing a head body being lifted above a recording medium in the magnetic head device shown in FIG. 1.

FIG. 2 is a side view of the head body being lifted above the recording medium in the magnetic head device of FIG. 1.

The head body 13 is being lifted due to an air flow generated when the recording medium 15 rotates. When the recording medium 15 vertically teeters, the load beam 11 vertically teeters about the corner 11b1 serving as the teeter support point to thereby maintain the altitude of the head body 13 at a predetermined height H1. At this time, the pivot 11f of the load beam 11 comes in contact with the top surface of the head body 13 via the flexure 14 to support the head body 13 so that it is allowed to teeter. The pivot 11f moves on a circumference B having the corner 11b1 of the load beam 11 as the center thereof. The flexure 14 shown in FIG. 1 is not shown in FIG. 2 through FIG. 4 for the purpose of clarity.

The teetering distance of the head body 13 in the direction parallel to the front surface 15a of the recording medium (the direction denoted as X2 in FIG. 2) is equal to the teetering distance of the pivot 11f of the load beam 11 in the direction parallel to the front surface 15a of the recording medium.

As in the case of this embodiment, if the height of the corner 11b1 serving as the support point of the vertical teeter of the load beam 11 and the height of the pivot 11f from the front surface 15a of the recording medium are substantially the same, then the pivot 11f passes the corner 11b1 and vertically moves about an intersection of a straight line C, which is parallel to the front surface of the recording medium, and a circumference B. Therefore, the teetering distance of the pivot 11f in the direction parallel to the front surface of the recording medium 15a can be minimized.

Thus, in the magnetic head device of this embodiment, even if the vertical teeter of a recording medium increases due to a reduced thickness of the recording medium or even if the width of the center core of the head body 13 is reduced to, for example, 200µm or less, the teetering distance of the head body 13 in the direction parallel to the front surface 15a of the recording medium can be made smaller than it used to, and the center core of the head body 13 can be retained in an area of the recording medium 15, which is activated by the energy of the laser beam 17.

Figure 3:
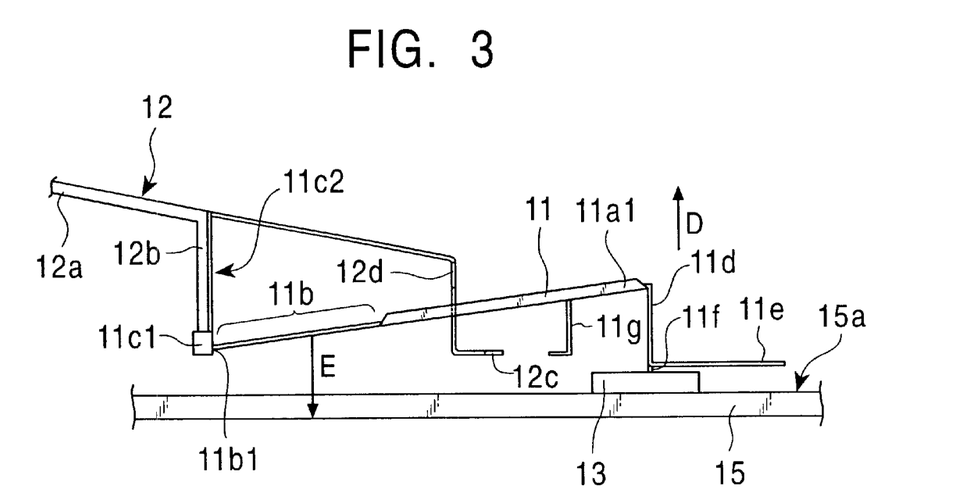
FIG. 3 is a side view showing the head body being in contact with the recording medium in the magnetic head device shown in FIG. 1.

FIG. 3 is a side view showing the head body 13 in the magnetic head device of FIG. 1, the head body 13 being in contact with the front surface 15a of the recording medium.

In the magnetic head device according to the present embodiment, when the head body 13 supported by the distal end of the load beam 11 lands on the front surface 15a of the recording medium, the head body 13 pushes up the distal end of the load beam 11 in the direction of arrow D, causing the load beam 11 to flex away (upward) from the recording medium 15 at the teeter support point, the corner 11b1. The load beam 11 flexed upward presses the head body 13 against the front surface 15a of the recording medium due to the reaction in the direction of arrow E. This arrangement obviates the need for machining the elastic portion of the load beam so that the elastic portion flexes at a predetermined angle in order to retain an elastic force required for pressing the head body into contact with the front surface of the recording medium, as in the prior art.

Figure 4:
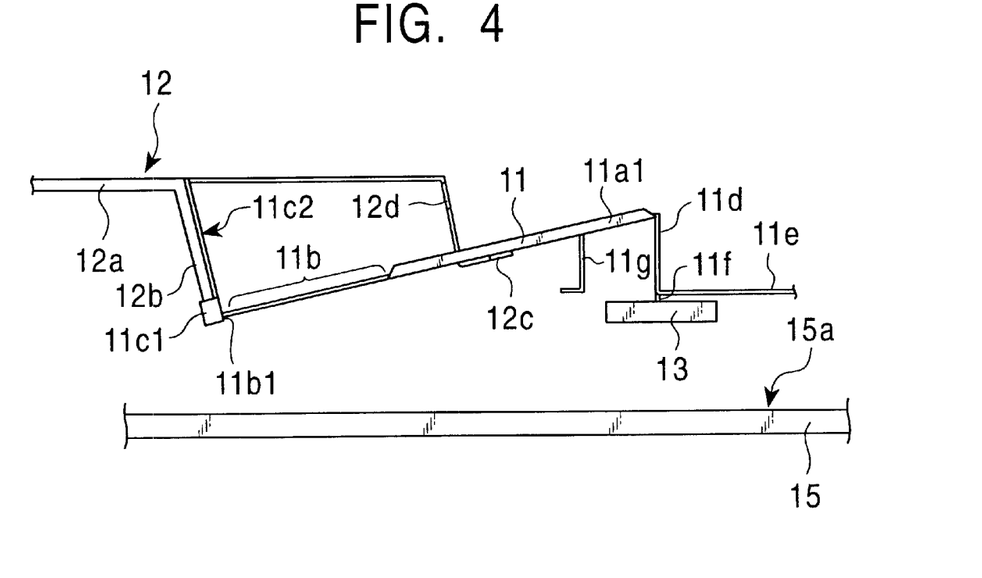
FIG. 4 is a side view showing the head body withdrawn from the recording medium in the magnetic head device shown in FIG. 1.

FIG. 4 is a side view showing the magnetic head device of FIG. 1 wherein the head body 13 has been withdrawn from above the recording medium 15.

The magnetic head device according to the embodiment is provided with a braking member 12c that is formed integrally on the carriage 12, projected toward the front of the carriage 12, and crosses below the load beam 11.

To remove the recording medium 15 from an optical disk apparatus or the like, it is necessary to move the carriage 12 upward in the drawing to withdraw the load beam 11 together with the carriage 12 in the direction away from the recording medium 15. At this time, the braking member 12c supports the load beam 11 from thereunder, making it possible to prevent the load beam 11 from flexing toward the recording medium 15 due to the weight of the head body 13 attached to the distal end of the load beam 11.

This embodiment is provided with a braking member 12d that crosses above the load beam 11 so as to also restrict the upward movement of the load beam 11.

In this embodiment, the braking members 12d and 12c are formed integrally on the carriage 12; however, these braking members may alternatively be formed as discrete members.

Figure 5:
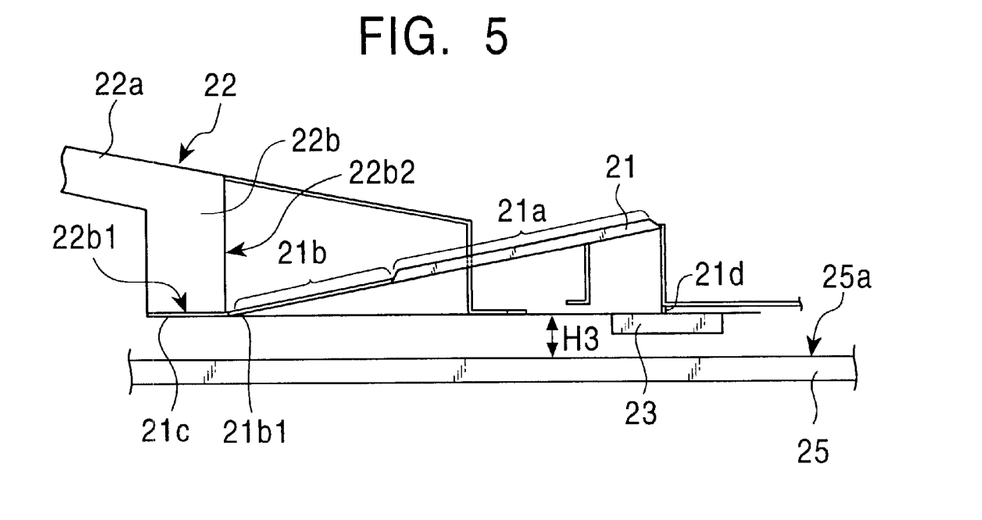
FIG. 5 is a side view showing a magnetic head device according to another embodiment of the present invention.

FIG. 5 is a side view showing a magnetic head device according to another embodiment of the present invention.

In this embodiment also, a main body 22a of a carriage 22 having rigidity extends over to a recording medium 25, and has a bent portion 22b that bends at a distal end of the main body 22a toward a recording medium 25. The load beam 21 has a rigid portion 21a and an elastic portion 21b as in the case of the magnetic head of FIG. 1.

In this embodiment, a proximal end portion 21c of the load beam 21 is bonded to a surface 22b1 at a distal end of the bent portion 22b of the carriage 22, the surface 22b1 opposing a front surface 25a of the recording medium 25. A contact portion 21b1 serves as a support point of connection between the bent portion 22b of the carriage 22 and the load beam 21, the contact portion 21b1 of the elastic portion 21b of the load beam 21 being in contact with the distal end of a front surface 22b2 of the bent portion 22b of the carriage 22. The load beam 21 vertically teeters around the contact portion 21b1.

The distal end portion of the load beam 21 has a construction similar to that of the magnetic head device of FIG. 1. A pivot 21d, which works as a teeter support point, supports a head body 23 so that it is allowed to teeter. In this embodiment also, the head body 23 is supported by the load beam 21 via a flexure as in the case of the magnetic head device of FIG. 1; however, the flexure is not shown in FIG. 5.

FIG. 5 shows the head body 23 in its lifted state. At this time, the contact point 21b1 serving as the support point for the vertical teeter of the load beam 21, and a pivot 21d are substantially at the same height from the front surface 25a of the recording medium. Hence, as in the case of the magnetic head device of FIG. 1, the teetering distance of the pivot 21d in the direction parallel to the front surface 25a of the recording medium can be minimized. This means that the teetering distance of the head body 23 in the direction parallel to the front surface 25a of the recording medium can be minimized.

In the magnetic device of FIG. 5 also, when the head body 23 supported by the distal end of the load beam 21 lands on the front surface 25a of the recording medium, the head body 23 pushes up the distal end of the load beam 21, causing the load beam 21 to flex upward in the drawing, with the contact portion 21b1 as the support point. The load beam 21 flexed upward presses the head body 23 into contact with the front surface 25a of the recording medium by a reaction force.

Thus, the magnetic head device in accordance with the present invention is configured so that the support member that supports the head body is coupled, above the recording medium, to the bent portion of the carriage which is dropped in toward the front surface of the recording medium, and the support member is able to vertically teeter, using the support point of connection to the carriage as the support point of the vertical teeter.

Hence, according to the present invention, the support point for the vertical teeter of the support member can be arbitrarily set closely to the front surface of the recording medium within a range wherein the distal end of the bent portion of the carriage does not come in contact with the recording medium. This arrangement makes it possible to reduce the difference in height from the front surface of the recording medium between the support point and the mounting portion of the head body that is attached to the support member.

Thus, according to the present invention, the teeter of the head body in the direction parallel to the front surface of the recording medium when the recording medium vertically teeters can be reduced. In other words, a magnetic head device can be provided which is able to control a sway of a head body in the direction parallel to the front surface of a recording medium to a required range even if the vertical teeter of the recording medium increases due to a reduced thickness of the recording medium and the width of the center core of the head body is required to be reduced.

Moreover, in the present invention, the main body of the carriage extends over the recording medium, and the support member is coupled to the bent portion of the carriage, permitting the total length of the support member to be reduced. This makes it possible to provide a magnetic head device that is resistant to vibrations or the like and permits higher assembly accuracy.

In addition, according to the present invention, the support member is connected, above the recording medium, to the bent portion of the carriage that is dropped in toward the front surface of the recording medium. Hence, when the head body is in contact with the front surface of the recording medium, the head body pushes up the distal end of the support member to thereby cause the support member to flex away from the recording medium, using the connecting support point as the support point. The support member flexed upward presses the head body into contact with the front surface of the recording medium due to reaction. This arrangement obviates the need for machining the support member so as to provide with a flexing structure, thus allowing load toward the recording medium to be easily applied to the head body.

What is claimed is:

1. A magnetic head device comprising:
   a carriage having a main body extending over a recording medium, and a bent portion that is bent at a distal end of the main body toward the recording medium;
   an elastically deformable support member connected to the bent portion of the carriage; and
   a head body which is installed to the support member via another elastic member, and opposes the recording medium,
   wherein a support point of connection between the bent portion of the carriage and the support member is positioned closer to the recording medium than it is to the main body of the carriage, and the head body is mounted on a free end of the support member that extends along the recording medium from the support point of connection, and
   wherein the support member is fixed in surface-contact with the bent portion of the carriage, the support member is bent at a surface where the support member is fixed to the bent portion and extends along the recording medium, and a corner of the bend of the support member provides the support point of connection.

2. A magnetic head device according to claim 1, wherein the head body is able to teeter about a teeter support point provided on the support member, and the support point of connection and the teeter support point are positioned substantially at the same height from a front surface of the recording medium when the head body is being subjected to a lifting force above the recording medium due to an air flow produced when the recording medium moves.

3. A magnetic head device according to claim 1, wherein the carriage is provided with a braking member for restricting an amount of deformation of the support member toward the recording medium.

4. A magnetic head device comprising:
   a carriage having a main body extending over a recording medium, and a bent portion that is bent at a distal end of the main body toward the recording medium;
   an elastically deformable support member connected to the bent portion of the carriage; and
   a head body which is installed to the support member via another elastic member, and opposes the recording medium,
   wherein a support point of connection between the bent portion of the carriage and the support member is positioned closer to the recording medium than it is to the main body of the carriage, and the head body is mounted on a free end of the support member that extends along the recording medium from the support point of connection, and
   wherein the support member has a first bent surface opposing a recording medium and a second bent surface that is formed by bending the first bent surface in a direction along the recording medium, the head body being attached to the second bent surface directly or via another elastic member.

5. A magnetic head device according to claim 4, wherein the head body is able to teeter about a teeter support point provided on the support member, and the support point of connection and the teeter support point are positioned substantially at the same height from a front surface of the recording medium when the head body is being subjected to a lifting force above the recording medium due to an air flow produced when the recording medium moves.

6. A magnetic head device according to claim 4, wherein the carriage is provided with a braking member for restricting an amount of deformation of the support member toward the recording medium.

7. A magnetic head device comprising:
   a carriage having a main body extending over a recording medium, and a bent portion that is bent at a distal end of the main body toward the recording medium;
   an elastically deformable support member connected to the bent portion of the carriage; and
   a head body which is installed to the support member via another elastic member, and opposes the recording medium,
   wherein a support point of connection between the bent portion of the carriage and the support member is positioned closer to the recording medium than it is to the main body of the carriage, and the head body is mounted on a free end of the support member that extends along the recording medium from the support point of connection,
   wherein the recording medium consists of a disk housed in a cartridge having an opening, the main body of the carriage is positioned outside the cartridge, the bent portion of the carriage extends from the opening into the cartridge, and the support point of connection is positioned in the cartridge, and
   wherein the support member is fixed in surface-contact with the bent portion of the carriage, the support member is bent at a surface where the support member is fixed to the bent portion and extends along the recording medium, and a corner of the bend of the support member provides the support point of connection.

8. A magnetic head device according to claim 7, wherein the support member has a first bent surface opposing a recording medium and a second bent surface that is formed by bending the first bent surface in a direction along the recording medium, a head body being attached to the second bent surface directly or via another elastic member.

9. A magnetic head device according to claim 8, wherein the head body is able to teeter about a teeter support point provided on the support member, and the connection support point and the teeter support point are positioned substantially at the same height from a front surface of the recording medium when the head body is being subjected to a lifting force above the recording medium due to an air flow produced when the recording medium moves.

10. A magnetic head device according to claim 9, wherein the carriage is provided with a braking member for restricting an amount of deformation of the support member toward the recording medium.

11. A magnetic head device comprising:
    a carriage having a main body extending over a recording medium, and a bent portion that is bent at a distal end of the main body toward the recording medium;

an elastically deformable support member connected to the bent portion of the carriage; and a head body which is installed to the support member directly, and opposes the recording medium, wherein a support point of connection between the bent portion of the carriage and the support member is positioned closer to the recording medium than it is to the main body of the carriage, and the head body is mounted on a free end of the support member that extends along the recording medium from the support point of connection, and wherein the support member is fixed in surface-contact with the bent portion of the carriage, the support member is bent at a surface where the support member is fixed to the bent portion and extends along the recording medium, and a corner of the bend of the support member provides the support point of connection.

12. A magnetic head device according to claim 11, wherein the head body is able to teeter about a teeter support point provided on the support member, and the support point of connection and the teeter support point are positioned substantially at the same height from a front surface of the recording medium when the head body is being subjected to a lifting force above the recording medium due to an air flow produced when the recording medium moves.

13. A magnetic head device according to claim 11, wherein the carriage is provided with a braking member for restricting an amount of deformation of the support member toward the recording medium.

14. A magnetic head device comprising:

a carriage having a main body extending over a recording medium, and a bent portion that is bent at a distal end of the main body toward the recording medium;

an elastically deformable support member connected to the bent portion of the carriage; and a head body which is installed to the support member directly, and opposes the recording medium, wherein a support point of connection between the bent portion of the carriage and the support member is positioned closer to the recording medium than it is to the main body of the carriage, and the head body is mounted on a free end of the support member that extends along the recording medium from the support point of connection, and wherein the support member has a first bent surface opposing a recording medium and a second bent surface that is formed by bending the first bent surface in a direction along the recording medium, the head body being attached to the second bent surface directly or via another elastic member.

15. A magnetic head device according to claim 14, wherein the head body is able to teeter about a teeter support point provided on the support member, and the support point of connection and the teeter support point are positioned substantially at the same height from a front surface of the recording medium when the head body is being subjected to a lifting force above the recording medium due to an air flow produced when the recording medium moves.

16. A magnetic head device according to claim 14, wherein the carriage is provided with a braking member for restricting an amount of deformation of the support member toward the recording medium.

17. A magnetic head device comprising:

a carriage having a main body extending over a recording medium, and a bent portion that is bent at a distal end of the main body toward the recording medium;

an elastically deformable support member connected to the bent portion of the carriage; and a head body which is installed to the support member directly, and opposes the recording medium, wherein a support point of connection between the bent portion of the carriage and the support member is positioned closer to the recording medium than it is to the main body of the carriage, and the head body is mounted on a free end of the support member that extends along the recording medium from the support point of connection, wherein the recording medium consists of a disk housed in a cartridge having an opening, the main body of the carriage is positioned outside the cartridge, the bent portion of the carriage extends from the opening into the cartridge, and the support point of connection is positioned in the cartridge, and wherein the support member is fixed in surface-contact with the bent portion of the carriage, the support member is bent at a surface where the support member is fixed to the bent portion and extends along the recording medium, and a corner of the bend of the support member provides the support point of connection.

18. A magnetic head device according to claim 17, wherein the support member has a first bent surface opposing a recording medium and a second bent surface that is formed by bending the first bent surface in a direction along the recording medium, a head body being attached to the second bent surface directly or via another elastic member.

19. A magnetic head device according to claim 17, wherein the head body is able to teeter about a teeter support point provided on the support member, and the support point of connection and the teeter support point are positioned substantially at the same height from a front surface of the recording medium when the head body is being subjected to a lifting force above the recording medium due to an air flow produced when the recording medium moves.

20. A magnetic head device according to claim 17, wherein the carriage is provided with a braking member for restricting an amount of deformation of the support member toward the recording medium.

* * * * *